3,631,077
NEW 16α-ALKYL-STEROIDS

Filippus Johannes Zeelen and Albertus Joannes van den Broek, Oss, and Martinus Johannes van den Heuvel, Vught, Netherlands, assignors to Organon Inc., West Orange, N.J.
No Drawing. Filed Jan. 22, 1969, Ser. No. 793,180
Claims priority, application Netherlands, Feb. 1, 1968, 6801449
Int. Cl. C07c 169/32, 169/34
U.S. Cl. 260—397.3
5 Claims

ABSTRACT OF THE DISCLOSURE

The present invention relates to the preparation of a group of novel $\Delta^4$-3-keto-16α-alkyl-20-oxygenated steroids of the pregnane and 19-nor-pregnane series substituted in 21-position with a hydroxyl, acyloxy or fluoro group, and possibly unsaturated in 6–7 position, which compounds have strong progestative, ovulation-inhibiting and pregnancy-maintaining properties.

---

The invention relates to the manufacture of new 16α-alkyl compounds of the pregnane and 19-nor-pregnane series.

More particularly the invention relates to the manufacture of compounds of the formula:

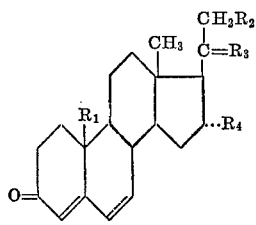

in which:
$R_1$=H or $CH_3$,
$R_2$=OH, OAcyl or fluoro,
$R_3$=H(OH), H(OAcyl) or keto,
$R_4$=an alkyl group with 2–4 carbon atoms, and
$C_6$–$C_7$=saturated or unsaturated.

The above-mentioned new compounds have proved to be very valuable on account of their strong progestative, ovulation-inhibiting and pregnancy-maintaining activities.

It is especially surprising that the present 16α-alkyl compounds have a very prolonged progestative activity, which up to now could only be obtained by esterification of a hydroxy-steroid with progesterone activity, for example, by esterification of 17α-hydroxy-progesterone with a higher aliphatic carboxylic acid. Further it is also surprising that the 16α-methyl derivatives of the compounds mentioned before only have a moderate or nonprolonged progestative activity and are also less active as regards the other activities mentioned.

Therefore the invention relates to the manufacture of the 16α-alkyl derivatives of the above-mentioned series, the 16α-alkyl group of which possesses 2–4 carbon atoms.

The manufacture of these compounds takes place by starting from a 16α-alkyl-(19-nor)-progesterone or from the corresponding $\Delta^5$-3-hydroxy or $\Delta^5$-3-acyloxy compound, which grouping is afterwards converted into a $\Delta^4$-3-keto group in a conventional manner, and introducing into such a starting product in 21-position the group $R_2$ by any method known per se, followed, if desired, by reduction of the 20-keto group, esterification of the thus obtained 20-hydroxyl group, and/or introduction of a double bond between the C-atoms 6 and 7.

The 21-hydroxyl group can be introduced in various manners, for example, by direct 21-acetoxylation with leadtetra-acetate in the presence of boron trifluoride, followed by saponification. A better method consists in that first the 21-diiodide compound is prepared by treating the (19-nor)-progesterone compound with iodine in the presence of calcium chloride, after which this compound is treated with an alkali metal salt of a lower aliphatic fatty acid, followed by saponification of the resulting 21-acyloxy compound.

Another method which is frequently adopted and which starts from a $\Delta^5$-3-hydroxy-steroid which is afterwards converted in a conventional manner into the desired $\Delta^4$-3-keto-steroid, relates to the reaction of a 20-keto-(19-nor)-pregnane with an alkyloxalyl compound, for example, ethyl-oxalate, to prepare the corresponding 21-ethoxalyl compound, from which the 21-mono-iodine-steroid is prepared in a conventional manner, which steroid is converted into the 21-acetoxy compound by treatment with, for example, potassium acetate, which compound is converted into the free 21-hydroxyl compound, if desired.

The 21-iodine compound can also be obtained by direct bromination of a $\Delta^5$-3-acyloxy-20-keto-(19-nor)-pregnene to obtain the corresponding 5,6,21-tribromo compound which is converted into the $\Delta^5$-3-acyloxy-20-keto-21-iodine compound by treatment with an alkali metal iodide.

If the bromination is performed in the presence of cupric bromide only bromide is introduced in 21-position. The thus obtained 21-bromine compound can also be used for the preparation of the corresponding 21-acyloxy compound.

The 16α-alkyl-21-hydroxy compounds according to the invention can be esterified by any method known per se with an organic or inorganic acid, or with a functional derivative thereof.

For preference an organic carboxylic acid with 1–18 carbon atoms is applied.

The introduction of a fluoro atom in 21-position can also be performed in various manners. A preferred method consists in that the relative 21-hydroxyl compound is first treated with a sulphonic acid halide, usually the chloride, after which the thus obtained 21-sulphonate is treated with an alkali metal iodide and the resulting 21-mono-iodine compound is reacted with silver fluoride or another metal fluoride, such as potassium fluoride.

The 21-iodine compound can also be obtained by bromination, followed by treatment with, for example, sodium iodide.

It is also possible to convert the 21-sulphonate, for example, the 21-tosylate or 21-mesylate, directly into the 21-fluoride by treatment with a metal fluoride.

Another method relates to the reaction of the 21-alkyl-oxalyl compound, the preparation of which has been described above, with $FClO_3$.

The introduction of the $\Delta^6$-bond can take place either before or after the introduction of the 21-substituent, for example by treating the relative steroid with a quinone, such as chloranyl, 1,2-naphthaquinone and 1,4-naphthaquinone, if required, in the presence of an acid.

Analogous to the method described above is the process in which a Δ⁵-3-hydroxy or Δ⁵-3-acyloxy compound instead of a Δ⁴-3-keto compound is taken as starting material, which grouping is converted in a known manner into a Δ⁴-3-keto group or into a Δ⁴,⁶-3-keto group via a Wettstein-Oppenauer oxidation after introduction of the 21-substituent.

The 20-hydroxy or acyloxy compounds according to the invention can be obtained by partial reduction of the 20-keto group in the Δ⁴-3,20-diketo-16α-alkyl-21-substituted compounds, prepared by the methods described above, and, if desired, by esterification of the 20-hydroxyl group or reduction of the 20-keto group after introduction of the desired 21-substituent into a Δ⁵-3-acyloxy-16α-alkyl-20-keto compound, and esterification of the resulting 20-hydroxyl compound, after which the Δ⁵-3-acyloxy group, if required, after partial hydrolysis of the 3-acyl group, is converted in a conventional manner into the Δ⁴-3-keto group, after which the 20-acyloxy group can be hydrolysed and then esterified again, if desired.

Another method characteristic of the 16α-alkyl-19-nor-pregnanes according to the invention, consists in that Δ⁵-3-acyloxy-16α-alkyl-20-keto-pregnene is taken as starting material, which is converted by a method known per se for the preparation of 19-nor-steroids into a 3-acyloxy-5α-halo-6,19-oxido-16α-alkyl-20-keto-pregnane, which is converted into the corresponding 21-acetoxy compound by bromination in 21-position and treatment with, for example, potassium acetate, after which the 3-acyloxy-5α-halo-6,19-oxido grouping is converted in a conventional manner into a Δ⁴-3-keto-19-nor-grouping. By hydrolysis, followed, if required, by esterification the desired Δ⁴-3,20-diketo - 16α - alkyl-21-hydroxy (or acyloxy)-19-nor-pregnene compounds can be obtained, which can be converted into the 20-hydroxy (acyloxy), 21-fluoro and/or Δ⁶-derivatives by the methods described above.

The invention is further illustrated by the following examples:

EXAMPLE I

To a solution of 5 gm. of 16α-ethyl-progesterone and 2.5 gm. of calcium chloride in 50 ml. of methanol was added 5 gm. of calcium hydroxide. To this mixture was added gently in nitrogen atmosphere and at a temperature of 25° C., a solution of 8.1 gm. of iodine and 2.5 gm. of calcium chloride in 25 ml. of methanol.

After stirring the reaction mixture for 15 minutes it was poured into a solution of 3.75 gm. of sodium thiosulphate in 7.5 ml. of acetic acid and 375 ml. of ice water.

The precipitate formed was filtered off, washed with water and dissolved in 260 ml. of acetone. Then a solution was added of 15 gm. of potassium acetate in 20 ml. of water and 10 ml. of acetic acid while stirring and in nitrogen atmosphere. The mixture was stirred for 3 hours and refluxed, and then cooled down. The organic layer was separated. This layer was stirred vigorously for 1 hour together with 1.25 gm. of zinc powder. The zinc was separated and the filtrate evaporated to 200 ml. Then 100 ml. of water was added and the acetone evaporated.

A solution of 25 gm. of potassium carbonate in 300 ml. of methanol was added to a solution of 12.4 gm. of the thus obtained crude product in 100 ml. of methanol, after which the mixture was stirred for 30 minutes in nitrogen atmosphere and at a temperature of 40° C. Then the mixture was cooled down, acidified with acetic acid to pH 6.5 and then diluted with 750 ml. of water. The methanol was distilled in vacuo, and the precipitate filtered off and washed with water until neutral. The resulting crystals were dissolved in benzene and chromatographed over 100 gm. of silicagel. The eluates with benzene/ether 7:3 contain the 16α-ethyl-21-hydroxy-progesterone, which after recrystallisation from methylene chloride/ether has a melting point of 171–172.5° C. $[\alpha]_D = +144.7°$ (1% in CHCl₃).

In the same manner the 16α-propyl-21-hydroxy-progesterone, the 16α-ethyl-21-hydroxy-19-nor-progesterone and the 16α-butyl-21-hydroxy-19-nor-progesterone were prepared.

EXAMPLE II

To a solution of 4.5 gm. of 16α-ethyl-21-hydroxy-progesterone in 45 ml. of pyridine was added 22.5 ml. of acetic anhydride. The mixture was kept at room temperature for 8 hours and then poured out into ice water. The precipitate was filtered off and recrystallised from ether to obtain the 21-acetate of 16α-ethyl-21-hydroxy-progesterone. Melting point: 132.5–133° C.; $[\alpha]_D = +148.7°$ (1% in CHCl₃).

In the same manner the 21-esters were prepared of the 16α-ethyl-21-hydroxy-progesterone, derived from valeric acid, trimethyl acetic acid and succinic acid, as well as the 21-esters of the 16α-propyl-21-hydroxy-progesterone, derived from acetic acid and caproic acid, the 21-esters of the 16α-ethyl-21-hydroxy-19-nor-progesterone, derived from acetic acid, butyric acid and oenanthic acid, and the 21-esters of the 16α-butyl-21-hydroxy-19-nor-progesterone, derived from acetic acid, propionic acid and valeric acid.

EXAMPLE III

Four millilitres of phenylpropionic acid chloride was added to a solution of 4 gm. of 16α-ethyl-21-hydroxy-progesterone in 20 ml. of pyridine at 0° C. The mixture was stirred for 4 hours, then diluted with 5 ml. of water and then stirred again for 45 minutes. Then it was poured into 200 ml. of ice water and extracted with methylene chloride. The extract was washed with a dilute NaOH solution, dilute sulphuric acid and water until neutral. The extract was dried on sodium sulphate, after which the solvent was distilled off in vacuo. The crude product was chromatographed over silicagel. Obtained after solution with benzene/ether 9:1 the 21-phenylpropionate of 16α-ethyl-21-hydroxy-progesterone. Melting point: 104–107° C.; $[\alpha]_D = 123.5°$ (1% in CHCl₃).

In the same manner the 21-esters were prepared derived from oenanthic acid, capric acid, palmitic acid and cyclohexyl propionic acid. Further the esters were prepared of the 16α-propyl-21-hydroxy-progesterone, derived from phenyl-propionic acid and capric acid, the esters of the 16α - ethyl-21-hydroxy-19-nor - progesterone, derived from phenylpropionic acid and lauric acid, and the esters of the 16α-butyl-21-hydroxy-19-nor-progesterone, derived from caprilic acid, phenylpropionic acid and palmitic acid.

EXAMPLE IV

A solution of 5 gm. of 16α-ethyl-21-acetoxy-progesterone, 5 gm. of chloranyl and 80 ml. of t.butanol was refluxed for 1 hour and then evaporated in vacuo to a small volume. The residue was taken up in methylene chloride, washed with a dilute sodium hydroxide solution and with water until neutral.

The solvent was distilled off in vacuo and the residue chromatographed over silicagel to obtain the Δ⁶-16α-ethyl-21-acetoxy-progesterone.

In the same manner the 16α-ethyl-21-hydroxy-19-nor-progesterone and the 21-phenylpropionate of 16α-butyl-21-hydroxy-19-nor-progesterone were converted into the corresponding Δ⁶-derivatives.

EXAMPLE V

To a solution of 20 gm. of 16α-ethyl-21-hydroxy-progesterone in 135 ml. of pyridine was added 5.3 ml. of methane sulphonyl chloride at 0° C. After stirring the reaction mixture for 1½ hours it was poured into 1.35 l. of ice water, after which the precipitate was filtered off, washed with water and dried.

A solution of 11.15 gm. of sodium iodide in 400 ml. of acetone was added to a solution of 23.9 gm. of this crude product in 750 ml. of acetone, after which the mixture was refluxed for 10 minutes.

The precipitate was filtered off and the filtrate evaporated to 600 ml. and then diluted with 1.2 l. of warm water (50° C.) after which the crystals formed were collected, washed with water and dried.

To a solution of 9.8 gm. of this crude product in 130 ml. of acetonitril was added 16 ml. of 25% silver fluoride. After stirring the reaction mixture for 22 hours at 65° C. in nitrogen atmosphere, it was cooled down and the silver fluoride filtered off.

The filtrate was washed with 1½ l. of water and extracted with methylene chloride. The extract was washed with water and dried on sodium sulphate. The solvent was evaporated in vacuo. The crude product was chromatographed over silicagel to obtain the 16α-ethyl-21-fluoro-progesterone. Melting point: 156–156.5° C.;

$$[\alpha]_D = +166.9°$$

(1% in $CHCl_3$).

In the same manner the 16α-propyl-21-hydroxy-progesterone, the 16α-ethyl-21-hydroxy-19-nor-progesterone, the 16α-butyl-21-hydroxy-19-nor progesterone and the $\Delta^6$-16α-ethyl-21-hydroxy-19-nor-progesterone were converted into the corresponding 21-fluorides.

EXAMPLE VI

A suspension of 73 gm. of $\Delta^5$-3β-acetoxy-16α-ethyl-20-keto-pregnene in 1.3 l. of diethyl ether was cooled down to 13° C., after which 42 gm. of dibromo-dimethylhydantoide was added, while stirring. Then was added 16.7 ml. of a 70% perchloric acid solution in water, maintaining the temperature below 20° C. Then the mixture was stirred for half an hour, after which a 10% sodium sulfite solution in water was added. The organic layer was separated and successively washed with 5% sodium sulfite, water, 5% sodium bicarbonate and water until neutral. Obtained after evaporation of the ethereal solution to 250 ml. and the addition of 75 ml. of hexane: 68 gm. of 3β,6β-dihydroxy-5α-bromo-16α-ethyl - 20 - keto-pregnane-3-acetate.

A suspension of 158 gm. of lead tetra acetate and 18 gm. of iodine in 2.5 l. of cyclohexane was refluxed for 10 minutes, after which 74 gm. of the steroid obtained above and 4.6 gm. of azo-diisobutyronitril were added.

The mixture was refluxed for 2 hours, cooled down and filtered. The filtrate was washed, dried with sodium sulphate and evaporated to dryness in vacuo.

To the residue methylene chloride was added, after which the resulting solution was evaporated to 300 ml. Then the methylene chloride was replaced by methanol at normal pressure, after which the solution was kept at −10° C. for 16 hours. The resulting crystals were filtered off, washed with methanol and dried in vacuo at 45° C. to obtain 49 gm. of 3β-acetoxy-5α-bromo-6β,19-epoxy-16α ethyl-20-keto-pregnane.

A solution of 45 gm. of this compound in 330 ml. of dichloroethane and 640 ml. of methanol was hydrolysed with 7 gm. of potassium hydroxide in 56 ml. of methanol at 12° C., for 3½ hours, into the corresponding 3β-hydroxy compound.

A suspension of 40 gm. of this compound in 320 ml. of methanol was treated with 12.5 ml. of a solution of 4 N HBr/methanol, after which 105 ml. of a solution of 0.82 M bromine was added dropwise, while stirring. Stirring was continued for another 15 minutes, after which a solution of 20% sodium acetate in water was added. Then 800 ml. of water was added to obtain the 3β-hydroxy-5α,21-dibromo-6β,19-epoxy-16α-ethyl-pregnane as a precipitate.

To a solution of 30 gm. of this 21-bromide in 330 ml. of acetone were added 12 gm. of potassium acetate, 12 gm. of potassium iodide and 4 ml. of acetic acid. The mixture was stirred at room temperature for 15 minutes and then refluxed for 4 hours.

After cooling down to 5° C. the steroid was precipitated with 0.65 l. of ice water containing 0.5 gm. of sodium sulfite. The precipitate was filtered off and washed with water. The solid substance was dried to obtain 28 gm. of 3β,21-dihydroxy-5α-bromo-6,19-epoxy-16α-ethyl-20-keto-pregnane-21-acetate.

To a solution of 29 gm. of this compound in 400 ml. of chloroform was added at 40° C. 110 ml. of 4 N $CrO_3$. Then the mixture was stirred for 4½ hours and then cooled down to 20° C. Then 150 ml. of water was added. The organic layer was separated, neutralised with 10 gm. of sodium bicarbonate, dried with sodium sulphate and filtered. To the filtrate 8 ml. of pyridine was added, after which is was evaporated to dryness in vacuo. The residue was taken up in 120 ml. of pyridine, heated on a steambath for 30 minutes and then poured into water. After extraction with chloroform, evaporation of the extract and crystallisation of the residue from acetone/petroleum ether 17 gm. of $\Delta^4$-3,20-diketo-6β,19-epoxy-16α-ethyl-21-acetoxy-pregnene was obtained.

A boiling solution of 17 gm. of the above-mentioned steroid in 80 ml. of acetic acid was added to an activated and boiling suspension of 80 gm. of zinc in 235 ml. of acetic acid and 80 ml. of water.

The reaction mixture was refluxed for 5 minutes while stirring vigorously, after which the zinc was filtered off. The filtrate was poured into ice water, after which the aqueous mixture was extracted with chloroform, the extract washed with water and evaporated to dryness, and the residue crystallised from acetone/petroleum ether to obtain 12 gm. of $\Delta^4$-3,20-diketo-16α-ethyl-19,21-dihydroxy-pregnene-21-acetate.

Nine grams of this compound was dissolved in 80 ml. of chloroform at 40° C., after which 30 ml. of 4 N $CrO_3$ was added in nitrogen atmosphere. Then the mixture was stirred for 3 hours at 40° C., after which it was cooled down to room temperature. Then 35 ml. was added and the organic layer separated and neutralised with 3 gm. of sodium bicarbonate. Then sodium sulphate was added and filtered off. The filtrate was evaporated to dryness in vacuo and the residue crystallised from methanol at −20° C. to obtain 8 gm. of $\Delta^4$-3,20-diketo-10-formyl-16α-ethyl-21-acetoxy-pregnene.

Of this compound 7.5 gm. was suspended in 40 ml. of methanol after which 150 ml. of a solution of 5% sodium hydroxide in methanol was added.

Then the solution was neutralised with 12 ml. of acetic acid and poured into ice water, after which the resulting precipitate was filtered off, chromatographed over silicagel and recrystallised from acetone/petroleum ether to obtain 5 gm. of the $\Delta^4$-3,20-diketo-16α-ethyl-21-hydroxy-19-nor-pregnene. Melting point: 130–133° C.; $[\alpha]_D = +99°$ ($CHCl_3$).

In the same manner the 16α-propyl and the 16α-butyl-21-hydroxy-19-nor-progesterone were prepared.

By the process described in Examples II and III these compounds were converted into a number of 21-esters derived from aliphatic, aromatic and araliphatic carboxylic acids, such as the 21-acetate, 21-oenanthate, 21-laurate, 21-phenylpropionate, 21-cyclopentyl propionate and the 21-hexahydrobenzoate.

EXAMPLE VII

To a solution of 4 gm. of 16α-ethyl-21-hydroxy-19-nor-progesterone in 28 ml. of pyridine was added 1.6 ml. of methane sulphonyl chloride, after which the mixture was stirred for 2½ hours at −20° C., poured into 280 ml. of ice water and extracted with chloroform. The extract was washed with 2 N sulphuric acid and water. Obtained after drying with sodium sulphate and evaporation to dryness: 5 gm. of crude $\Delta^4$-3,20-diketo-16α-ethyl-21-mesyl-oxy-19-nor-pregnene.

This compound was passed into a solution of 3.2 gm. of sodium iodide and 70 ml. of acetone, after which the mixture was refluxed for 30 minutes in nitrogen atmosphere and then concentrated in vacuo, at 45° C., to 95 ml. While stirring at 50° C. 675 ml. of water was added. Then the mixture was cooled to 20° C. and the resulting crystals filtered off and dried in vacuo to obtain 4.8 gm. of Δ⁴-3,20-diketo-16α-ethyl-21-iodi-19-nor-pregnene.

A solution of this product in 125 ml. of acetonitril was added to 16 ml. of a solution of 25% silver fluoride in water. Then the mixture was stirred for 24 hours at 65° C. in nitrogen atmosphere. Then the mixture was cooled down to 20° C. and the silver fluoride filtered off. The filtrate was concentrated in vacuo to 120 ml. and the residue poured into ice water. The precipitate was filtered off, washed with water, dried and dissolved in 75 ml. of acetone, filtered and evaporated, after which 12 gm. of potassium acetate and 2 ml. of acetic acid were added. The mixture was refluxed for 4 hours while stirring and then poured into water, extracted and evaporated to dryness. The residue was taken up in 75 ml. of methanol, after which a mixture was added of 0.3 gm. of sodium hydroxide, 0.6 ml. of water and 12 ml. of methanol. Then the mixture was kept at 10° C. for 30 minutes and then processed as described above to obtain a residue which after chromatography and crystatllisation from ether/petroleum ether yielded the Δ⁴-3,20-diketo-16β-ethyl-21-fluoro-19-nor-pregnene. Melting point: 157–159° C.; [α]$_D$=+122° (CHCl₃).

In the same manner the 16α-propyl and the 16α-butyl-21-hydroxy-19-nor-progesterone were converted into the corresponding 21-fluoro-derivatives.

EXAMPLE VIII

A suspension of 5 gm. of 16α-ethyl-21-hydroxy-Δ4-19-nor-pregnene-3,20-dione in 5 ml. of ethanol, 4.2 ml. of triethyl-orthoformiate and 20 mg. of p.toluene sulphonic acid was stirred for 60 minutes at 5° C. The reaction was decomposed with 0.2 ml. of pyridine. The crystals were sucked off and washed with ethanol, which contained a few drops of pyridine.

Of the crude 3-enolether 4.5 gm. was dissolved in 170 ml. of methanol and reduced with 0.5 gm. of NaBH₄ at 2° C. for 1½ hours. The excess of NaBH₄ was decomposed with acetic acid and the reaction mixture poured into water. The mixture was extracted with chloroform, washed with water until neutral and evaporated to obtain a residue which was taken up in 50 ml. of acetone and 0.5 ml. of concentrated hydrochloric acid. The reaction mixture was stirred for 45 minutes at room temperature, diluted with water, and the crude 20-hydroxyisomer mixture filtered off. From this mixture the 16α-ethyl-20β,21-dihydroxy-Δ⁴-19-nor-pregnene-3-on was obtained by crystallisation, from which the corresponding 20,21-diester was obtained by esterification with phenylpropionyl chloride in pyridine.

In the same manner Δ⁴-16α-ethyl-20-fluoro-pregnene and 19-nor-pregnene were converted into the corresponding 20-hydroxy compounds and converted into 20-esters, derived from acetic acid, oenanthic acid and phenyl propionic acid.

We claim:
1. Novel 16α-alkyl-steroids having the formula:

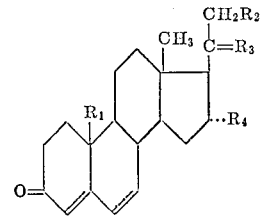

wherein $R_1$ is selected from the group consisting of hydrogen and a methyl group, $R_2$ is selected from the group consisting of a hydroxyl group, an acyloxy group and a fluoro atom, $R_3$ is selected from the group consisting of H(OH), H(OAcyl) and a keto group, $R_4$ is an alkyl group with 2–4 carbon atoms, and $C_6$–$C_7$ is selected from a saturated and an unsaturated bond.

2. A compound selected from the group consisting of Δ⁴ - 3,20 - diketo-16α-ethyl-21-hydroxy-pregnene and 21-acylates thereof.

3. Δ⁴-3,20-diketo-16α-ethyl-21-fluoro-pregnene.

4. A compound selected from the group consisting of Δ⁴-3,20-diketo-16α-ethyl-21-hydroxy-19-nor-pregnene and 21-acylates thereof.

5. Δ⁴-3,20-diketo-16α-ethyl-21-fluoro-19-nor-pregnene.

References Cited

UNITED STATES PATENTS 3,212,969  10/1965  Bowers _____ 167—58

OTHER REFERENCES

Steroids by Loken, No. 9 (1967), pp. 217–219 relied on.

"Chemistry of the Steroids" by Shoppee, Butterworth Publishing Co., p. 279 relied on.

"J. Amer. Chem. Soc." article by Sandoval et al. (1953), 75, p. 4117 relied on.

ELBERT L. ROBERTS, Primary Examiner

U.S. Cl. X.R.

260—397.47